Figure 1:
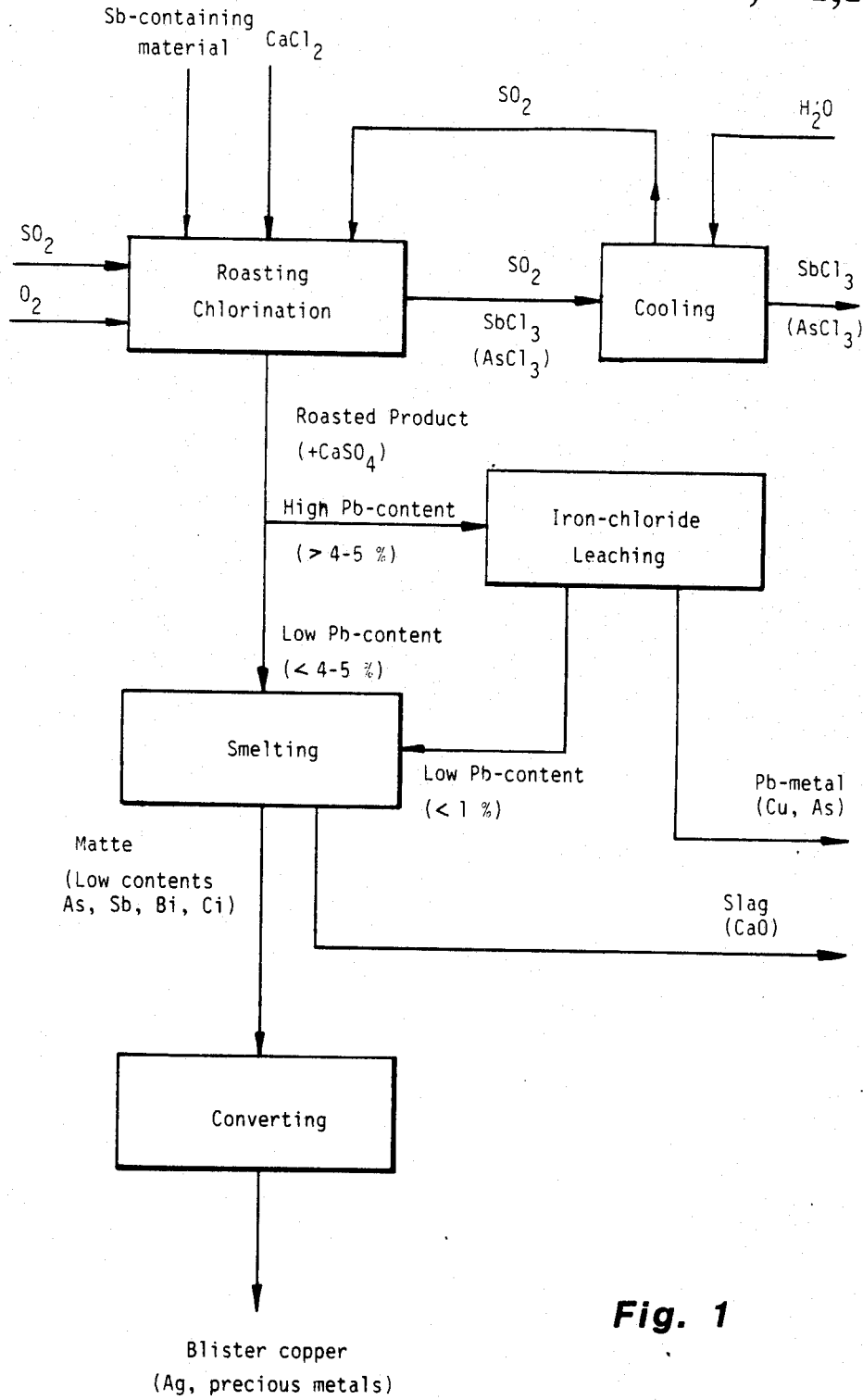

United States Patent [19]

Holmström

[11] Patent Number: 4,612,171

[45] Date of Patent: Sep. 16, 1986

[54] METHOD FOR RECOVERING METAL VALUES FROM MATERIALS CONTAINING COPPER AND/OR PRECIOUS METALS

[75] Inventor: Sven Å. Holmström, Ursviken, Sweden

[73] Assignee: Boliden Aktiebolag, Stockholm, Sweden

[21] Appl. No.: 655,051

[22] Filed: Sep. 27, 1984

[30] Foreign Application Priority Data

Oct. 3, 1983 [SE] Sweden ................ 8305425

[51] Int. Cl.$^4$ ................ C22B 1/08; C01G 23/02
[52] U.S. Cl. ................ 423/22; 423/46; 423/88
[58] Field of Search ................ 423/88, 22, 46

[56] References Cited

U.S. PATENT DOCUMENTS

| | | |
|---|---|---|
| 1,107,310 | 8/1914 | Johnson . |
| 3,386,815 | 6/1968 | Görling et al. ............ 75/9 |
| 4,092,152 | 5/1978 | Borbely ............ 423/88 |

FOREIGN PATENT DOCUMENTS

| | | |
|---|---|---|
| 907869 | 8/1972 | Canada . |
| 355886 | 1/1921 | Fed. Rep. of Germany . |
| 78/00030 | 8/1978 | PCT Int'l Appl. . |
| 81/00305 | 10/1981 | PCT Int'l Appl. . |
| 331365 | 12/1970 | Sweden . |

OTHER PUBLICATIONS

English translation of SE-A-830184-9.
R. Bloise et al., Advance in Extractive Metallurgy, 1977, London, IMM, pp. 53-56.
G. Morizot et al., Complex Sulphide Ores, The Inst. Min. and Metallurgy, 1978, pp. 151-158.
Imris et al., Advances in Extractive Metallurgy, 1977, The Inst. of Min. and Metallurgy, pp. 161-167.
H. W. Parsons, CIM Bulletin 71, Mar. 1978, pp. 196-204.

Primary Examiner—John Doll
Assistant Examiner—Wayne A. Langel
Attorney, Agent, or Firm—Burns, Doane, Swecker & Mathis

[57] ABSTRACT

The invention relates to an improvement in a method for recovering metal values from copper-containing and/or precious-metal containing materials which also contain antimony and/or bismuth in such high quantities as to render working-up of the materials with conventional metallurgical processes difficult or impossible. In accordance with the improvement, the material is subjected to a chlorination volatilization process in a manner to bring the antimony and/or bismuth content of the material to a predetermined low level acceptable for the continued working-up of the material in conventional process stages, while maintaining the metal values of the material in a substantially unaffected form. The volatilization process is best carried out at temperatures of between 450° C. and 750° C., preferably between 550° C. and 650° C.

The chlorination process can be carried out on materials included in the group: sulphidic or oxidic-ore concentrates, matte, speiss, oxidic and metallic intermediate products. In certain cases it is convenient to convert the material to another form within the group, for example the matte, prior to carrying out the chlorination process.

9 Claims, 2 Drawing Figures

METHOD FOR RECOVERING METAL VALUES FROM MATERIALS CONTAINING COPPER AND/OR PRECIOUS METALS

The present invention relates to a method for recovering metal values from materials which, in addition to containing copper and/or precious metals also contain antimony and/or bismuth in such large quantities as to make it difficult or even impossible to work-up the materials with the aid of conventional metallurgical processes. More particularly, although not exclusively, the invention relates to a method which enables concentrates and other sulphidic material, for example, matte, having a total content of antimony and bismuth of more than 0.5 to 1% by weight, to be worked-up more readily with the aid of conventional metallurgical processes. The method also facilitates the working-up of other not-readily processable materials containing antimony and/or bismuth to recover the valuable metal content thereof. For example, by means of the method according to the present invention it is possible to work-up effectively metallic materials, such as intermediate products obtained from metallurgical processes, and speisses and oxidic materials, such as intermediate products, for example slimes obtained from wet gas purification processes and from the manufacture of arsenic trioxide.

Problems are often encountered when working-up ores containing antimony, partly because such ores normally contain large quantities of metal values and partly because when using physical methods it is impossible to produce metal concentrates in which the antimony content is of the low level required for the subsequent metallurgical processes to which the concentrates are subjected. What has been said in the aforegoing with respect to antimony also applies, to a large extent, to bismuth, even though hereinafter only antimony is discussed. Thus, the amount of antimony present in sulphidic copper concentrates and in sulphidic precious-metal concentrates varies considerably, and some concentrates can only be worked-up with great difficulty or with the inclusion of expensive further process stages. Because of this the present day market price of concentrates rich in antimony is much lower than that of the "purer" concentrates. In Table 1 below there is given, by way of example, a list of concentrates normally found on the market and containing antimony in amounts of 0.5% or thereabove.

TABLE 1

| Concentrate Type/country | Main average composition (% by weight) | | | | | | |
|---|---|---|---|---|---|---|---|
| | Cu | Fe | Sb | As | Bi | S | Ag |
| Equity/Canada | 20.3 | 25.4 | 3.48 | 4.4 | — | 33.1 | 0.43 |
| Algamarca/Peru | 27.5 | 18.3 | 5.0 | 5.0 | 0.11 | 30.0 | 0.22 |
| El Indio/Chile | 27.1 | 9.0 | 0.54 | 10.0 | 0.06 | 28.4 | 0.04 |
| Quiruvilca/Peru | 25.9 | 10.6 | 3.30 | 8.4 | 0.31 | 29.7 | 0.20 |
| Silver Field/Canada | 4.0 | 11.6 | 0.50 | 9.4 | 0.10 | 12.6 | 1.70 |
| Lepanto/Philippines | 30.6 | 12.1 | 0.71 | 10.3 | 0.04 | 30.6 | 0.02 |
| Sam Goosley/Canada | 13.6 | 27.3 | 7.00 | 1.7 | 0.22 | 39.4 | 1.05 |
| Apirsa/Spain | 18.2 | 28.8 | 1.80 | 0.3 | <0.01 | 36.9 | 0.11 |

When concentrates of the kind listed in Table 1 are introduced as raw material in a conventional copper smelter, antimony will be partially roasted during the partial roasting process to which the ingoing sulphide concentrate is normally subjected. The extent to which the antimony can be roasted, however, is intimately connected with the amount of silver present in the concentrate, probably because it is more difficult to split-off antimony-containing minerals rich in silver than other antimony minerals. Actually, of the concentrates listed in Table 1, only Lepanto and El Indio can be charged to a conventional copper roaster to any appreciable extent. The remaining concentrates can only be taken into the copper process to a limited extent, wherewith the total accepted antimony intake, the so-called antimony ceiling, is dependent upon the unit processes available in the smelter being using.

The most usual method of "coping" with such smelt material is to dilute it with "pure material", to obtain a total antimony content which can be coped with. As will be understood, this can only be done provided that the highest acceptable antimony ceiling is not reached.

The antimony contained in concentrates which possess very high metal values can be eliminated from said concentrates by leaching with a sulphide solution. This method is particularly troublesome, however, especially with respect to the handling of the solution and its regeneration, and also with respect to problems arising in connection with the apparatus used. In addition, chemical costs are high and the leached concentrates cannot be subsequently dealt with as conventional roasted solids, but require the provision of additional separate process stages. A few small leaching plants intended for antimony-containing concentrates are in operation, however. In our earlier patent U.S. Pat. No. 4,017,369 there is described a method for regenerating sulphide leaching solutions. As reported in this patent, however, the leaching method disclosed therein is only suitable for application in very particular cases.

Antimony can also be eliminated to a certain extent by subjecting the concentrate to an oxidising partial roasting process with a prolonged residence time. Described in our earlier patent application SE-A-No. 8303184-9 is a method intended for roasting arsenic-containing sulphidic concentrates, optionally having an elevated antimony content, for example concentrates of the El Indio and Lepanto kind. During the roasting process a substantial amount of the arsenic is eliminated from the concentrate, a large percentage of the antimony present also being eliminated at the same time. As mentioned in the introduction of this patent application, however, the roasting process described therein cannot be used in connection with concentrates rich in silver, and in the majority of cases the expulsion of antimony does not result in acceptable antimony levels, despite the fact that it is possible with such roasting processes to treat concentrates containing relatively high percentages of antimony, particularly when the roasting process is effected in two stages.

It is also possible to eliminate antimony in the later stages of the copper process, for example, by soda-refining blister copper, although this methodology is only applied to lower marginally the antimony content of isolated melts in order to adjust the antimony content of said melts to a level suitable for the subsequent refining stages. Both the chemical costs involved and the increased wear to furnace linings, however, make this method prohibitive for more general application.

Another method of eliminating high antimony contents in melts is by fuming-off the antimony while rolling the melts as described, for example, in our patent specification U.S. Pat. No. 4,244,733. Rolling of the melts is effected in a rotary converter of the Kaldo type. The method, however, is only attractive in the case of isolated antimony peaks, since the process time in Kaldo furnaces is expensive and it is not usual for Kaldo furnaces to have additional capacity over and above that for which they are intended, i.e. primarily for smelting and possibly also for converting complex copper concentrates.

It will be understood from the aforegoing that there is a great need and an earnest desire for a method by means of which the antimony content and/or the bismuth content of copper concentrates, or of precious-metal concentrates, or of any other material containing metal values introduced into the process, can be lowered as early as possible in the chain of process stages, to levels which are found acceptable in roasted solids of the kind which are to be worked-upin a conventional copper process, so as to recover the copper and/or precious-metal values contained in said concentrates or material. Furthermore, it is a requisite of such a method that the antimony present can be expelled readily with the aid of simple apparatus and at the lowest possible chemical costs, i.e. at a low consumption of less expensive chemicals. Neither shall the method require the chemicals to be regenerated in order to sustain the economy of the process. Another requisite of such a method is that it shall not be limited in its application with respect to materials of differing compositions, e.g. varying As/Sb-ratios, silver contents and sulphide contents. It shall also be possible to carry out the method within a reasonable length of time, particularly with regard to the expulsion of the final 10–20 percent of the antimony content of the material. Last, but by no means least, it is specifically required of such a method that the material treated is not permitted to carry therewith any substances or elements which may be harmful to the subsequent process stages. Among other things, strict requirements are placed on the chlorine contents of the material.

Methods have been proposed for expelling antimony from antimony-rich material, in order to recover antimony values therefrom, particularly for the manufacture of antimony compounds, for example, antimony trioxide, by means of chlorinating volatilization with the aid of mutually different chlorides, for example, calcium chloride. Examples of such methods are found in R. Bloise et al, Advances in Extractive Metallurgy 1977 London, IMM, pages 53–56 and G. Morizot et al, Complex Sulphide Ores, The Inst. Min. and Metallurgy 1978, pages 151–158. The metals present in the material, for example, lead, silver, copper and zinc, are assumed to form chlorides, and hence it is proposed that these chlorides may be recovered by leaching the resultant roasted solids. The method is also assumed to be suitable solely with respect to material containing minor quantities of valuable metals.

There is also described in the literature a 2-stage segregation process comprising chlorination and reduction stages for recovering antimony from oxidic antimony materials (Imris et al, Advances in Extractive Metallurgy 1977, The Institution of Mining and Metallurgy, pages 161–167). It has long been known to chlorinate sulphide ores at low temperatures, in order to recover metal and sulphur values therefrom. A summary of the process proposals considered to be of more importance in the present context are found in an article by H-W Parsons (CIM Bulletin 71, March 1978, 196–204). All of these processes relate to complete chlorination processes, and hence all of the metal-value content of the materials is converted to chlorides, in order to subsequently work-up the treated material hydrometallurgically. None of the materials described in this publication and subjected to chlorination treatment has contained As, Sb or Bi. Thus, the known chlorination processes are unable to provide a suitable input material for conventional smelters.

It has now been found possible to utilize the chlorination technique to provide a method which will fulfill the aforementioned process needs and desiderata concerning the processing of copper material and/or precious-metal material containing antimony and/or bismuth. It has surprisingly been found that when applying a method according to the invention having the characterizing features set forth in the claims forming part of the specification, it is possible to expell antimony and any bismuth present selectively and substantially completely from copper and/or precious-metal materials containing large quantities of these elements while ensuring that the metal values of the treated material are not expelled or bound as chlorides to a prohibitive extent or that the treated material contains non-reacted residues of chlorinating agent.

Thus, it has been found that the losses of copper and precious-metal values to the chloride-containing gas phase and to the product of condensation can be maintained at a surprisingly and satisfactorily low level, while maintaining the chloride content of the treated material at a level which is acceptable for the continued process, as beforeindicated. In other words, the material processed in accordance with the invention can be viewed in the same way as any normal copper-smelt starting material or copper-leaching starting material whatsoever and can be processed by means of conventional pyrometallurgical processes in the absence of any quantitative limitations. In order for a copper-smelt material to be accepted without limitations with respect to the amount of antimony and/or bismuth entering the system, it is necessary for the amount of antimony and bismuth present in the resultant roasted solids to lie at least beneath 0.1–0.2%, and to restrict as far as possible the chloride contents of the roasted solids to beneath 0.1–0.2%. Since chlorine-containing gas is corrosive and is liable to seriously damage the gas-processing system, it is desirable to avoid the generation of such gases in the subsequent copper process. When practising the method according to the invention, there is obtained a material or roasted solids which subsequent to the chlorination process is principally free of all chlorine, as opposed to known chlorination methods for recovering antimony and base metals.

The antimony-containing material can be processed in many different ways within the scope of the invention. Thus, the chlorination agent used may be in, liquid or solid form at room temperature, for example, HCl, $NH_4Cl$, $CaCl_2$ and NaCl. It is also possible to use metal chlorides, such as chlorides of iron and copper. Preferably, however, the cheapest available chemical is used, wherewith $CaCl_2$ is in many cases an attractive chlorination agent, partly because of its relatively low price and partly because calcium is often a desired flux component in the subsequent smelting process. The solid chlorination agents are the most favourable from the aspect of handling and of metering the agents to the system. Another inexpensive chlorination agent suitable in the present context in a hydrochloric-acid based pickling-bath solution containing iron or copper. Such solutions often present to the manufacturing industry troublesome dumping problems, and hence the destruction of such solutions in conjunction with their use as chlorination agents can be an attractive solution, both to the destruction problem and to the choice of a suitable chlorination agent.

There are also available on the market many kinds of valuable-metal-containing materials, which are rich in chlorides, often present as copper or precious metal chlorides. These materials have hitherto been considered very difficult and harmful to recycle and work-up, but the present process provides the possibility to work-up the materials under the utilization of its chloride contents for antimony removal from antimony-containing material of the kind described in the foregoing. Thus, the valuable-metal-containing material is employed both as a chlorinating agent and as a smelting raw material.

The material can be processed in different kinds of atmospheres, and may, for example, be carried out in an inert atmosphere, such as a nitrogen-gas atmosphere, or in an oxidizing environment, in the presence or absence of sulphur dioxide. As an example of this latter environment can be mentioned a sulphur dioxide-water-steam atmosphere.

The chlorination process can be carried out in apparatus of a kind which will ensure that the material remains in the apparatus for a period of time sufficient to reach the desired, predetermined impurity level. The apparatus shall also ensure good contact between gas phase and solids. Suitable apparatus in this respect include different types of rotary furnaces, particularly drum-type furnaces, multiple-hearth roasters and fluidized bed furnaces.

During the chlorination process, the temperature is maintained at a low temperature, such as to avoid smelting or sintering of the material, but sufficiently high to ensure a good vaporization reaction rate. Normally, a temperature of between 450° C. and 750° C. is suitable in this respect. In normal conditions it has been found suitable to restrict the temperature to a range of 500°–600° C. In this respect, the temperature is selected with respect to the mineralogical composition of the material and with respect to the temperatures at which the various complex minerals are split-off.

The amount of chlorinating agent charged to the system is critical, insomuch as it must be limited so that only a minimum of chloride remains in the processed material, while ensuring at the same time that the minimum levels of antimony and bismuth are reached.

This means that the chlorination agent must be charged to the system in an amount lying immediately above the stoichiometric quantity calculated on the amounts in which those elements which are simultaneously volatilized as chlorides, are present in the concentrate, i.e. in principle antimony, arsenic, mercury, tin and bismuth. Arsenic, mercury and tin can be expelled more readily than the others, and thus the expulsion of these elements constitutes no problem when eliminating antimony from the concentrate. If antimony is eliminated to the extent desired, mercury, arsenic and tin will also be volatilized to a suitable extent. This implies no disadvantage and, on the contrary, is desirable with respect to the subsequent process steps. This shall be borne in mind when calculating how much chlorination agent will be required.

Although the method according to the invention may constitute a separate, additional process stage in a conventional copper process, it is practical and, in the majority of cases, desirable to carry out the method in conjunction with the conventional partial roasting of the concentrate prior to the copper smelting stage. It has been found that chlorination and roasting can be carried out simultaneously in one and the same furnace without interaction and with extremely good results. The chlorination process can also be carried out in conjunction with the second roasting stage of a 2-stage partial roasting process, such as that described in SE-A-No. 8303184-9. The chlorination process can also be carried out in the first roasting stage of a sulphating roasting process, such as the process described, for example, in SE-B-No. 7507507-7 and the corresponding U.S. Pat. No. 4,069,041, these processes constituting the introductory process stages in the so-called RSLE-process.

Figure 2:
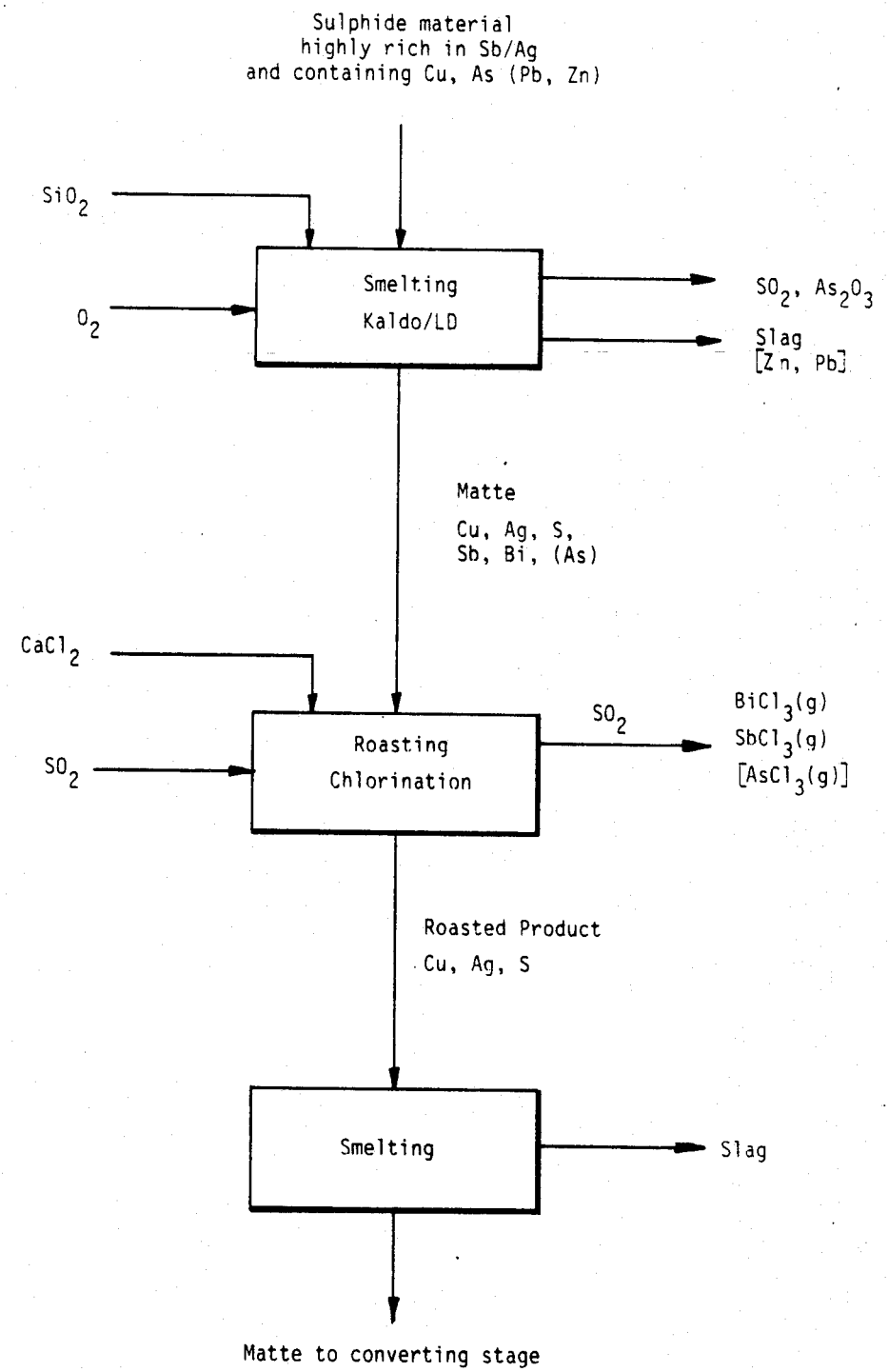

The invention will now be described in more detail with reference to a number of preferred embodiments and with reference to the accompanying drawings, in which FIG. 1 is a flow sheet illustrating one embodiment of the invention suitable for working-up antimony-containing material in general, in conjunction with its further processing in a copper plant; and FIG. 2 is a flow sheet of an embodiment particularly suited for working-up highly contaminated sulphide concentrates containing high metal-values.

In the embodiment illustrated in the flow sheet of FIG. 1, an antimony-containing material, for example a concentrate of the type Sam Goosly, Equity, Silver Field or Quiruvilca, is charged together with a solid chlorination agent, here indicated and exemplified as $CaCl_2$, in an amount immediately above the stoichiometric amount for chlorinating all the antimony, arsenic, bismuth and tin contained by the material, to a roasting furnace intended for the partially roasting of sulphidic copper smelt material. The roasting process can be readily carried out in a conventional multi-hearth roaster, and also in a fluidized-bed roaster, provided that a sufficiently long residence-time for the material in the roaster can be ensured, for example, by returning the roasted solids, as suggested in accordance with the method described in our abovementioned document SE-A-No. 8303184-9.

The roasting process is carried out at temperatures between 450° and 750° C. In the case of the concentrate mentioned here, however, the best chlorination result is obtained with $CaCl_2$ at a roasting temperature of 550°–600° C. The residence time in the roaster is regulated to at least 2–3 hours. In order to maintain the oxygen potential at the low level required, sulphur dioxide is suitably charged to the roasting process, for example by recycling sulphur dioxide from the washing stage, as indicated in the flow sheet. Oxygen need only be supplied to the extent required to maintain the heat balance.

Consequently, the outgoing roaster gas is richer in sulphur dioxide than the outgoing gas from conventional partial copper-concentrate roasting processes. The gas also contains chlorides of antimony, arsenic and bismuth formed and volatilized during the roasting process. Subsequent to cooling and washing the roaster gas and extracting its sulphur-dioxide content, the chlorides absorbed in the washing water are dumped or worked-up to commercial products.

The roasted solids obtained by the roasting process contain substantially all the metal values contained in the concentrate, in an unaffected sulphidic form, together with iron and that part of the sulphide sulphur which has not been roasted-off. Thus, the extent to which metal values are lost in the gas can be held to a substantially negligible level, provided that the amount in which the chlorination agent is charged to the system is restricted to the aforeindicated level, wherewith even the amount of residual chloride present in the roasted solids is practically negligible. The roasted solids can then be passed to a conventional copper smelting process, together with conventional roasted solids, and there smelted to a matte rich in copper and/or precious metal and containing substantially all the valuable-metal content of the concentrate and but low percentages of arsenic, antimony, bismuth and chloride. In certain cases, depending upon the type of concentrate used, the matte may contain very low percentages of copper. However, even though the copper content of the starting material is low, a matte will be formed from remaining metal sulphides.

When the antimony-containing materials are rich in lead and the roasted solids consequently contain substantial quantities of lead, the roasted solids can be first subjected to an iron-chloride leaching process, to recover the major part of the lead content of the solids, prior to said solids being passed to the smelting process for converting the remainder of the metal values to matte form.

In addition to forming said matte there is also formed, during the smelting process, an iron-silicate slag, which contains the major part of the calcium supplied to the system through the chlorination agent.

The matte is then converted in a conventional manner, to a metal melt containing the copper content and the silver content present in the starting material, together with any other precious-metal values present therein. The precious metals are recovered from the metal melt in a conventional manner, like their recovery from blister copper.

In many cases it may be desirable, or necessary, to convert different materials entering a smelting plant and containing impurities of the aforementioned kind to other products to which the aforedescribed chlorination method can be applied. For example, small quantities of concentrates having extremely high metal values and extremely high total quantities of antimony, bismuth and arsenic, can be best worked-up when they are first smelted down to form an extremely rich, but impure matte. One such embodiment of the invention is illustrated in the flow sheet of FIG. 2. In accordance with this embodiment, the smelting process is suitably effected in a converter of the Kaldo or LD type, and is carried out so that the major part of the arsenic content of the material is fumed-off and recovered in a conventional manner from the furnace gases in the form of crude arsenic, $As_2O_3$. Attention is drawn in this respect by way of example to our previous patent SE-A-No. 8001847-6 (corresponding to Canadian Patent No. 1 154 971, issued Oct. 11, 1983). An advantage is gained when the arsenic content of the material to be chlorinated is low, partly because the process will then require less chlorination agent and partly because chloride products are formed to a lesser extent.

One advantage gained by subjecting the highly contaminated material rich in metal values to an introductory smelting stage is, inter alia, that the antimony and bismuth present are concentrated and that the amount of material to be chlorinated is reduced to substantially half of the amount entering the smelting stage. Thus, when practicing this embodiment, the roasting plant for the chlorination treatment stage can be made much smaller, or operated at a substantially elevated capacity. Smelting of the various small batches of concentrate can be carried out campaign-wise, and it can be mentioned that one day's production of a Copper Kaldo plant of conventional size corresponds to the smelting of about 300 tons of concentrate, this amount being sufficient for 3-4 weeks roaster requirements. The matte formed may, for example, contain as much as 5-10% Sb, 1-2% As, 30-40% Cu, 2-4% Ag, 0.1-0.3% Bi and the roasted solids obtained subsequent to the chlorination process will then have approximately the following analyses: 0.1% Sb, 0.2% As, 30-40% Cu, 2-4% Ag, 0.05% Bi and <0.1% Cl.

EXAMPLE 1

A copper/silver concentrate having a high antimony content and having substantially the analysis and the mineral content listed in Table II below was worked-up with the aid of the mutually different chlorination agents and in various atmospheres, the amount of chlorination agent charged to the system and the temperature of the system being varied during the working-up process.

TABLE II

| Element | Weight % |
|---|---|
| Cu | 13.6 |
| Fe | 27.3 |
| S | 39.4 |
| Sb | 7.0 |
| As | 1.70 |
| Ag | 1.00 |
| Bi | 0.22 |
| Mineral: tetrahedrite | $(Cu, Ag)_{12} Sb_4 S_{13}$ |
| arsenopyrite | FeAsS |
| pyrite | $FeS_2$ — |

The chlorination agents used in these tests were $NH_4Cl$, $CaCl_2.2H_2O$ and $NaCl$, respectively. A mixture of the concentrate and chlorination agent was heated in a rotary tube-furnace, with the temperature held constant. A stream of gas was passed over the mixture and the outgoing gas was passed through a filter, to extract condensed products from said gas. Concentrate in quantities of 10 g and a gas flow of 20 Nl/h were charged throughout the test.

The processed samples and the extracted condensed products were analysed chemically and assayed by X-ray diffraction. This was done in an attempt to establish the behaviour of silver and copper in particular, during the process.

In a first test series the concentrate was heated together with various chlorination agents in a nitrogen-gas atmosphere at 600° C. and 700° C. for 0.25-6 hours. The results obtained with the first test series are set forth in Table III below.

TABLE III

| Chlorination agent | | Temp | Time | Roasted-solid composition (Weight %) | | |
|---|---|---|---|---|---|---|
| Type | Weight (g) | °C. | h | As | Sb | Cl |
| $CaCl_2$ | 3 | 700 | 4 | 0.01 | 1.5 | 8.3 |
| $CaCl_2$ | " | " | 6 | 0.01 | 0.17 | 5.2 |
| $CaCl_2$ | " | 600 | 6 | 0.02 | 0.37 | >10 |
| NaCl | 3 | 700 | 4 | 0.01 | 2.3 | 14.9 |
| NaCl | " | " | 6 | 0.01 | 1.0 | 18.2 |
| $NH_4Cl$ | 6 | 700 | 1 | <0.01 | 1.9 | <0.02 |

TABLE III-continued

| Chlorination agent | | Temp | Time | Roasted-solid composition (Weight %) | | |
|---|---|---|---|---|---|---|
| Type | Weight (g) | °C. | h | As | Sb | Cl |
| NH$_4$Cl | " | " | 2 | <0.01 | 1.8 | <0.02 |
| NH$_4$Cl | " | " | 4 | <0.01 | 0.68 | <0.02 |
| NH$_4$Cl | " | " | 6 | <0.01 | 0.09 | <0.02 |

In a second series of tests the gas used was air. Those results of the most interest are set forth in Table IV below.

TABLE IV

| Chlorination agent | | Temp | Time | Roasted-solid composition (Weight %) | | | |
|---|---|---|---|---|---|---|---|
| Type | Weight (g) | °C. | h | As | Sb | S | Cl |
| CaCl$_2$ | 3 | 700 | 1 | 0.64 | 0.06 | 7.7 | 3.3 |
| CaCl$_2$ | " | " | 2 | 0.16 | 0.06 | 10.9 | 3.0 |
| CaCl$_2$ | " | " | 4 | 0.15 | 0.02 | 8.0 | 2.5 |
| CaCl$_2$ | " | 600 | 1 | 0.44 | 0.35 | 7.5 | 2.5 |
| CaCl$_2$ | " | " | 4 | 0.16 | 0.06 | 6.5 | 0.3 |
| CaCl$_2$ | 2 | 700 | 2 | 0.12 | 0.16 | 20.3 | 2.4 |
| CaCl$_2$ | " | " | 4 | 0.14 | 0.16 | 15.3 | 0.6 |
| CaCl$_2$ | " | " | 6 | 0.10 | 0.25 | 15.8 | <0.1 |
| CaCl$_2$ | " | 600 | 6 | 0.15 | 0.45 | 14.9 | <0.1 |
| CaCl$_2$ | 1.5 | 700 | 7.5 | 0.20 | 0.35 | 10.8 | 0.4 |
| CaCl$_2$ | 6 | 700 | 4 | 0.09 | 0.06 | 8.1 | 3.4 |
| CaCl$_2$ | " | 600 | 4 | 0.21 | 0.14 | 8.3 | 2.2 |
| CaCl$_2$ | " | " | 2 | 0.10 | 0.08 | 11.3 | 6.5 |
| NaCl | 6 | 700 | 7 | 0.03 | 3.58 | 10 | >5 |
| NaCl | " | 600 | 7 | 0.03 | 1.28 | 10 | >5 |
| NH$_4$Cl | 6 | 700 | 1 | 0.16 | 0.54 | 10.0 | <0.1 |
| NH$_4$Cl | " | 600 | 1 | 0.08 | 0.24 | 4.4 | 0.14 |
| NH$_4$Cl | " | " | 2 | 0.43 | 0.26 | 6.0 | <0.1 |

As will be seen from the results in Table IV, it is possible to expel antimony satisfactorily with respect to both NH$_4$Cl and CaCl$_2$, while NaCl in this instance does not result in a sufficiently low antimony content and leaves an excessively high residual chloride content.

When roasting with NH$_4$Cl as the chlorination agent, satisfactorily low levels of As, Sb and Cl are obtained after only 1 hour, at least at 700° C. At 600° C. the chloride content is somewhat higher than would otherwise be the case. When using CaCl$_2$ a satisfactory result is not obtained until the material has remained in the furnace for a relatively long period of time, for example 4 hours and more, irrespective of the temperature selected.

In a third series of tests, sulphur dioxide was charged to the furnace. The test series was carried out with calcium chloride as the chlorination agent, said chloride being charged to the system in varying quantities. The most interesting of the results obtained are set forth in Table V.

TABLE V

| Chlorination agent | | Temp | Time | Roasted-solid composition (Weight %) | | | |
|---|---|---|---|---|---|---|---|
| Type | Weight (g) | °C. | h | As | Sb | S | Cl |
| CaCl$_2$ | 2 | 700 | 2 | 0.03 | 0.03 | 25.0 | 0.56 |
| CaCl$_2$ | 1.75 | " | " | 0.12 | 0.05 | 26.5 | 0.89 |
| CaCl$_2$ | " | " | " | 0.02 | 0.10 | 24.7 | <0.1 |
| CaCl$_2$ | " | " | 3 | 0.07 | 0.01 | 25.4 | 0.24 |

As will be seen from Table V, acceptable end results are already achieved after 2 hours when CaCl$_2$ is used as the chlorination agent. This can be compared with the tests set forth in Table IV, where 6 hours were required to produce a corresponding end result when using CaCl$_2$.

By way of summary, it can be seen from Example 1 that the choice of chlorination agent can be critical, particularly when chlorinating in an inert gas atmosphere, where actually only NH$_4$Cl is sufficiently effective. When the chlorination process is carried out in conjunction with the roasting of the concentrate, it is possible to use both CaCl$_2$ and NH$_4$Cl. In this respect, CaCl$_2$ becomes more effective as the amount of sulphur dioxide present during the roasting process increases. This is indicated by the results set forth in the Tables IV and V. On the other hand, sodium chloride does not exhibit the same good chlorination results in the tests carried out.

EXAMPLE 2

A comparison test series was carried out in which the optimal test conditions according to Example 1 in an SO$_2$-rich atmosphere and at similar or even lower temperatures were used for chlorinating other concentrates and mixtures of concentrates also including other materials. It was found that similar results could be obtained as those in Example 1, irrespective of the mineral composition of the concentrate even at lower temperatures than that of the tests set forth in Table V. Examples of the results obtained from these roasting tests are listed in Table VI below.

TABLE VI

| Temp °C. | Time h | Ingoing composition | | | | Roasted solid compositions (weight %) | | | | |
|---|---|---|---|---|---|---|---|---|---|---|
| | | Cu | Ag | As | Sb | Cu | Ag | As | Sb | Cl |
| 700 | 2 | 25.9 | 0.20 | 8.4 | 3.3 | 28.5 | 0.25 | 0.12 | 0.08 | <0.1 |
| 700 | 2 | 27.5 | 0.22 | 5.0 | 5.0 | 29.6 | 0.26 | 0.02 | 0.07 | <0.1 |
| 700 | 2 | 4.0 | 1.7 | 9.4 | 0.5 | 6.1 | 2.1 | 0.29 | 0.11 | <0.1 |
| 520 | 2 | 10.3 | 1.05 | 6.8 | 2.4 | 12.4 | 1.2 | 1.1 | 0.05 | <0.1 |
| 520 | 2 | 19.3 | 0.4 | 4.1 | 4.2 | 20.6 | 0.46 | 0.30 | 0.03 | 0.15 |
| 550 | 2 | 4.1 | 1.5 | 0.5 | 3.1 | 4.2 | 1.6 | 0.02 | 0.43 | <0.1 |
| 520 | 2 | 12.1 | 0.1 | 13.2 | 5.3 | 15.1 | 0.12 | 0.93 | 0.15 | <0.1 |

Of the results from the tests shown in Table VI it is to note that temperatures down to about 500° C. are quite sufficient for good impurity removal. A low treating temperature is often desirable since problems with sintering and sticking are less severe at lower temperatures. It can in certain cases, i.e. depending on the mineralogical composition be necessary to raise the temperature to above 600° C., which temperature limit is proved sufficient in all tests for all treated materials.

EXAMPLE 3

Other materials containing arsenic and antimony have been successfully treated in accordance with the method of the invention. Speisses obtained in copper plants, and precipitated decopperizing mud formed when regenerating copper-electrolyte are examples of metallic intermediate products which can be worked-up by means of the method according to the invention. Oxidic intermediate products can also be processed to advantage in accordance with the invention, in order to eliminate As and Sb. In Table VII below there is shown the copper and impurity contents of such materials, both before and after a roasting process according to the method in which $CaCl_2$ is used as the chlorinating agent and the process is carried out in an $SO_2$-atmosphere at various temperatures for 2 hours.

TABLE VII

| Material | Temp °C. | Composition (% by weight) | | | | |
|---|---|---|---|---|---|---|
| | | Cu | As | Sb | Bi | Cl |
| Decopperizing mud, ingoing | — | 50.8 | 20.3 | 4.0 | 0.6 | — |
| Decopperizing mud, roasted | 700 | 54.3 | 0.09 | 0.03 | 0.01 | <0.1 |
| Speiss, ingoing | — | 33.0 | 10.7 | 5.3 | — | — |
| Speiss, roasted | 700 | 36.0 | 0.09 | 0.03 | — | <0.1 |
| Oxidic mud, ingoing | — | 4.0 | 15.0 | 2.0 | 1.0 | — |
| Oxidic mud, roasted | 700 | 6.8 | 0.25 | 0.016 | 0.01 | <0.1 |
| Oxidic mud, roasted | 450 | 5.6 | 0.42 | 0.04 | 0.1 | <0.1 |
| Mixed speiss and oxidic mud, ingoing | — | 9.5 | 14.0 | 4.0 | — | — |
| Mixed speiss and oxidic mud, roasted | 500 | 12.1 | 0.28 | 0.04 | — | <0.1 |

It will be seen from Example 3 that the invention can also be applied with other, not-readily processed antimony-containing materials than sulphide concentrates, even near the lowest temperature limit of the process.

EXAMPLE 4

A copper/silver concentrate of the same kind as that recited in Example 1 and having the same analysis was smelted down to form a silver-antimony rich matte and a slag. The composition of the concentrate and the matte is given below in Table VIII. The matte was treated in the same way as the materials recited in Example 3. The composition of the resultant roasted solids is given in Table VIII.

TABLE VIII

| Material | Composition (% by weight) | | | | | |
|---|---|---|---|---|---|---|
| | Cu | Fe | Ag | As | Sb | Bi |
| Concentrate | 13.6 | 27.3 | 1.00 | 1.70 | 7.0 | 0.22 |
| Matte | 17.7 | 30.5 | 1.35 | 0.90 | 11.4 | 0.27 |
| Roasted solids | 24.7 | 32.4 | 1.91 | 0.02 | 0.03 | 0.03 |

As will be seen from the test results set forth in Example 4, the concentrate can be smelted to a matte containing valuable metals together with antimony and bismuth, while lead, zinc and gangue can be removed and converted to a slag, as can also a part of the iron present if so desired. Arsenic departs with the gas generated during the smelting process, and is recovered from the gas in the form of crude arsenic ($As_2O_3$). The resultant roasted solids, which in terms of quantity are greatly reduced in relation to the amount of ingoing concentrate, can then be subjected to a chlorination roasting process, to form antimony-free roasted solids, which can be smelted in a conventional copper process without requiring additional treatment.

EXAMPLE 5

In a test series the effect of using chloride containing oxidic ashes with valuable metals as the only chlorinating agent was investigated. The main composition of the ash product was: 64% Cu, 3% Zn, 0.12% Ag, 4,8% Cl (as chlorides). The ash product was mixed with some of the earlier mentioned concentrates viz. Equity and El Indio in proportion (1:1) which was determined as providing substantial the stoichiometric amount of Cl. The mixture was treated to temperatures between 550°–600° C. during 2–3 h in sulphur dioxide atmosphere. The composition of the resultant roasted solids is given in Table IX.

TABLE IX

| Concentrate Mixture | Temp °C. | Roasted solids composition (weight %) | | | | | |
|---|---|---|---|---|---|---|---|
| | | Cu | Ag | As | Sb | Bi | Cl |
| Equity | 550 | 46.8 | 0.55 | 0.20 | 0.08 | 0.02 | <0.1 |
| Equity + El Indio (1:1) | 600 | 48.3 | 0.40 | 0.22 | 0.05 | 0.02 | <0.1 |
| Equity + El Indio (1:6) | 600 | 49.0 | 0.08 | 0.30 | 0.03 | — | <0.1 |

I claim:

1. A method for refining a material selected from the group consisting of copper-containing materials, precious metal-containing materials and mixtures thereof which also contain at least one of antimony and bismuth in such quantities as to inhibit processing of said material to extract metal values therefrom comprising heating a mixture of the material and a solid or liquid chlorination agent to a temperature of between 450° C. and 750° C., the amount of chlorination agent being slightly greater than the stoichiometric amount of the impurities to be chlorinated including antimony and/or bismuth whereby vaporized antimony and/or bismuth chloride is formed while maintaining the copper and/or precious metal values of the material in a substantially unaffected form and separating the vaporized antimony and/or bismuth chloride from the material.

2. The method according to claim 1, wherein the chlorination agent is selected from the group consisting of hydrochloric acid and chlorides of ammonium, sodium, calcium, iron or copper.

3. The method according to claim 1, wherein the material is a valuable-metal-containing oxidic waste product which contains chloride which is utilized as the chlorination agent.

4. The method according to claim 1, wherein the heating is conducted in the presence of sulphur dioxide.

5. The method according to claim 1, wherein the material is selected from the group consisting of sulphidic-ore concentrates, matte, speiss, oxidic-ore concentrates, oxidic intermediate products, metallic intermediate products and mixtures thereof.

6. The method according to claim 1, wherein the material is first converted from at least one of the materials of said group to at least one different material of said group prior to heating said material with the chlorination agent.

7. The method according to claim 6, wherein the material is first smelted to form a matte thereby eliminating a substantial part of its arsenic content, and the resulting matte is heated with the chlorination agent to further reduce the level of arsenic and to reduce the level of other chlorinateable impurities.

8. The method according to claim 1, wherein the material is heated with the chlorination agent at temperatures between 500° and 600° C.

9. The method according to claim 1, wherein the heating is conducted in an inert atmosphere.

* * * * *